United States Patent [19]

Uchida

[11] Patent Number: 4,575,117
[45] Date of Patent: Mar. 11, 1986

[54] STRIKING ENERGY ABSORBING STRUCTURE FOR STEERING WHEEL AND METHOD OF MANUFACTURING THE SAME

[75] Inventor: Sadao Uchida, Ichinomiya, Japan

[73] Assignee: Toyoda Gosei Co., Ltd., Nishikasugai, Japan

[21] Appl. No.: 620,295

[22] Filed: Jun. 13, 1984

[30] Foreign Application Priority Data

Jun. 14, 1983 [JP] Japan .............................. 58-106287

[51] Int. Cl.$^4$ ............................................. B60R 21/02
[52] U.S. Cl. ................................... 280/750; 280/751; 74/558.5; 200/61.54
[58] Field of Search ............... 280/751, 752, 753, 750; 74/558.5, 552; 200/61.54; 116/59

[56] References Cited

U.S. PATENT DOCUMENTS

| | | | |
|---|---|---|---|
| 2,946,869 | 7/1960 | Parks et al. | 280/750 |
| 3,087,352 | 4/1963 | Daniel | 74/558.5 |
| 3,223,797 | 12/1965 | Ordorica et al. | 200/61.54 |
| 3,823,618 | 7/1974 | Broyer | 74/558.5 |

Primary Examiner—Richard A. Bertsch
Attorney, Agent, or Firm—Cushman, Darby & Cushman

[57] ABSTRACT

A striking energy absorbing structure for a steering wheel is composed of a cover member, an energy absorbing member of a brittle plastic filling the inside of the cover member, and a horn switch member buried therebetween. Also disclosed is a method of manufacturing the above-described striking energy absorbing structure. The energy absorbing member is molded by casting a brittle plastic material into the inside of the cover member. In this cast molding, the horn switch member is previously set inside the cover member, so that the three members, that is, the cover member, the horn switch member and the energy absorbing member are simultaneously integrated with each other.

5 Claims, 5 Drawing Figures

STRIKING ENERGY ABSORBING STRUCTURE FOR STEERING WHEEL AND METHOD OF MANUFACTURING THE SAME

BACKGROUND OF THE INVENTION

1. Field of the Invention

The present invention relates to a striking energy absorbing structure for a steering wheel, the structure having composed of a cover member, an energy absorbing member of a brittle plastic, and a horn switch member disposed therebetween. The invention also pertains to a method of manufacturing the above-described striking energy absorbing structure.

2. Description of the Prior Art

A typical conventional striking energy absorbing structure of this kind is constructed such that, as shown in FIG. 1, after a cover member 1 and an energy absorbing member 2 are molded as respective separate members, a horn switch member 3 is generally attached to a part of the energy absorbing member 2, and the cover member 1 and the energy absorbing member 2 are attached to a boss plate 5. Therefore, the manufacture of the conventional striking energy absorbing structure requires separate forming molds for respectively molding the cover member 1 and the energy absorbing member 2. In addition, it is necessary to attach the horn switch member 3 to the energy absorbing member 2 and further to attach both the energy absorbing member 2 and the cover member 1 to the boss plate 5; hence, a large number of assembling steps is disadvantageously required.

SUMMARY OF THE INVENTION

It is an object of the invention to provide a striking energy absorbing structure composed of a cover member, an energy absorbing member of a brittle plastic filling the inside of the cover member, and a horn switch member buried therebetween.

It is another object of the invention to provide a method of manufacturing the above-described striking energy absorbing structure.

According to the invention, the energy absorbing member is molded by casting a brittle plastic into the inside of the cover member having the horn switch member set therein such as to be integrated with both the cover member and the horn switch member.

Accordingly, the invention makes it possible to employ the cover member as a female mold member in molding the energy absorbing member, so that it is possible to eliminate the need for any special mold for molding the energy absorbing member and thereby to reduce mold cost.

Further, the invention makes it possible to integrate the horn switch member with the cover member simultaneously with the molding of the energy absorbing member. Moreover, the cover member, the horn switch member and the energy absorbing member can be attached to a boss plate as one unit consisting of the integrated three members, so that it becomes possible to reduce the number of assembling steps by a large margin.

Furthermore, in the striking energy absorbing structure of the invention, the energy absorbing member also serves as a shape retaining member for the cover member, so that it is not necessary to bury inside the cover member any shape retaining insert for increasing the yield load value of the energy absorbing structure, and it is possible to improve the energy absorbing characteristics of the structure.

DESCRIPTION OF THE PREFERRED EMBODIMENT

Figure 1:
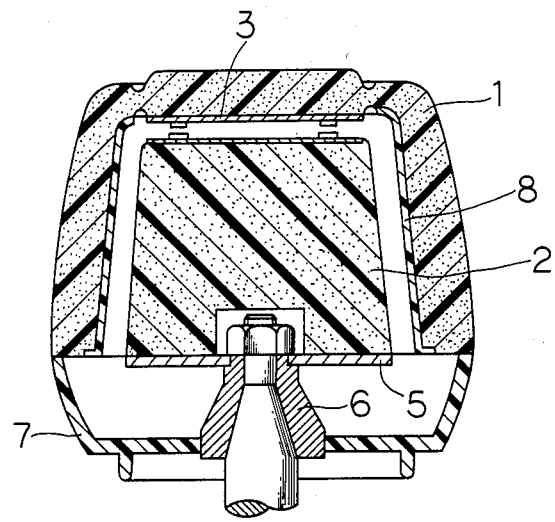
FIG. 1 is a schematic sectional view of an example of the conventional striking energy absorbing structure.
Figure 2:
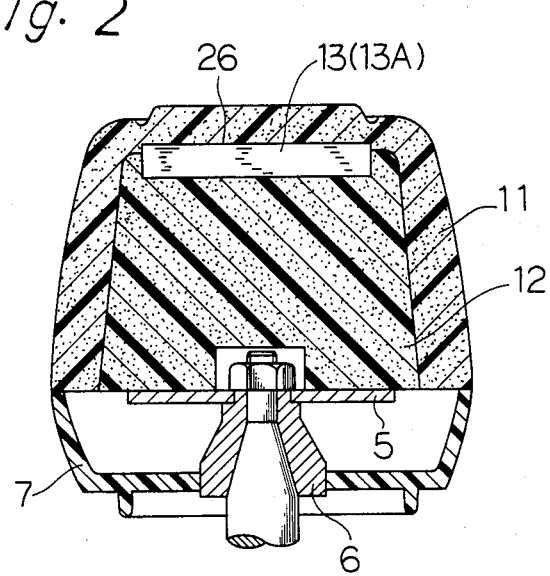
FIG. 2 is a schematic sectional view of one embodiment of the invention.

As shown in FIG. 2, a brittle plastic material energy absorbing member 12 is cast into the inside of cover member 11 having a horn switch member 13 (13A) molded integrally therebetween. More specifically, the energy absorbing member 12 fills the inside of the cover member 11, and the horn switch member 13 (13A) is buried between the cover member 11 and the energy absorbing member 12.

Figure 3:
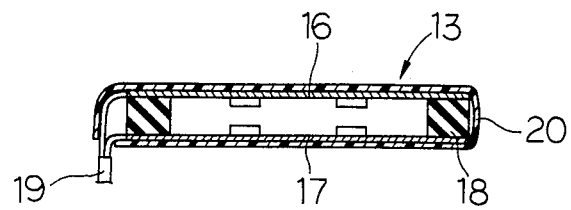
FIG. 3 is a schematic sectional view of a contact-type horn switch member employed in the embodiment of FIG. 2.
Figure 4:
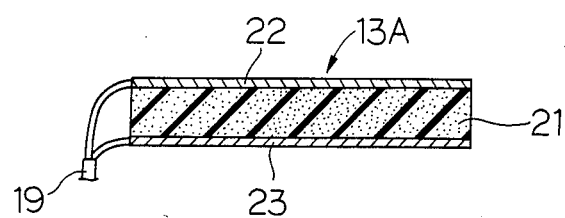
FIG. 4 is a schematic sectional view of a contactless-type horn switch member employed in the embodiment of FIG. 2.

As the horn switch member, it is possible to employ either a contact-type horn switch member 13 (see FIG. 3) or a contactless-type horn switch member 13A (see FIG. 4). The contact-type horn switch member 13 is composed of a horn plate 16, a contact plate 17, an insulating spring 18 interposed therebetween and a lead wire 19, which are hermetically covered with a flexible film 20 with only the lead wire 19 led out. On the other hand, the contactless-type horn switch member 13A is composed of an electrically-conductive rubber (piezoelectric type) 21 and conductor plates 22, 23 clamping the rubber 21 therebetween.

The cover member 11 is molded by, for example, injection of a flexible plastic, such as a flexible polyurethane, a flexible polyvinyl chloride or a flexible polyurethane or polyvinyl chloride foam. According to need, the cover member 11 has a shape retaining insert and/or a fitting insert buried therein within such a range that there is no adverse effect on the energy absorbing characteristics of the energy absorbing member 12. Further, it is preferable to previously form a setting recess 26 at the switch member setting portion of the cover member 11 in order to prevent the material from undesirably flowing into the area between the switch member 13 (13A) and the cover member 11 in the casting of the material, explained later, and to set the switch member 13 (13A) accurately.

Figure 5:
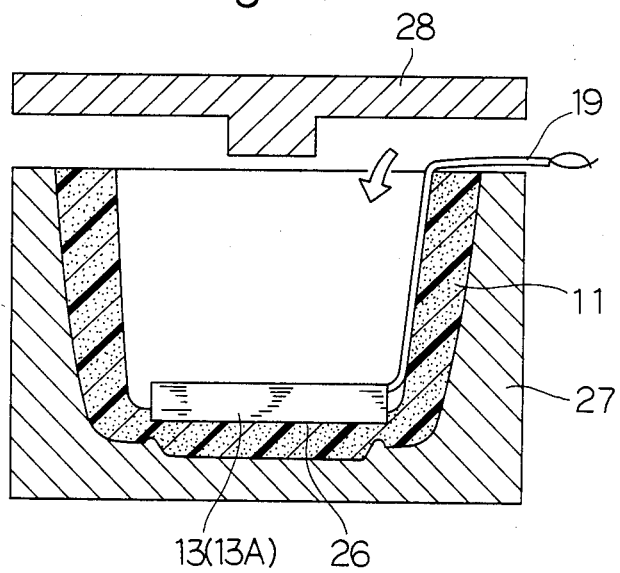
FIG. 5 is a schematic sectional view for showing a method of manufacturing the embodiment of FIG. 2.

As the brittle plastic for molding the energy absorbing member 12, a rigid foaming plastic is generally employed, such as a rigid foaming polyurethane or polystyrene. In the molding of the energy absorbing member 12, after the cover member 11 is molded, only a male mold member 28 is released. Then, as shown in FIG. 5, with the cover member 11 retained in a female mold member 27, the switch member 13 (13A) is set in the cover member 11. After the above-mentioned brittle plastic material is cast into the female mold member 27, the mold is closed with the male mold member 28 to foam and harden the material. In this case, the lead wire 19 is, as a matter of course, led out of the mold. In addition, the molding method is not limited to the above-described cast molding and the reaction injection molding (RIM) or the like may be employed.

The striking energy absorbing structure molded as described above is attached to the boss plate 5 as shown in FIG. 2. The attaching operation is advantageously easy and simple, since the members constituting the structure are attached to the boss plate 5 as one integrated unit. It is to be noted that in the Figures the reference numerals 6, 7 and 8 respectively denote a boss, a lower cover and a shape retaining insert.

What is claimed is:

1. A striking energy absorbing hub structure for a steering wheel, said hub structure being comprised of a hollow exterior cover member with one open end, an energy absorbing brittle plastic material molded inside said hollow cover, and a horn switch member integrally molded
    (a) said energy absorbing material fills the inside of said cover member; and
    (b) so that said horn switch member is buried between said cover member and said energy absorbing material.

2. A striking energy absorbing structure for a steering wheel according to claim 1, wherein said horn switch member is of a contact type which is composed of a horn plate, a contact plate, an insulating spring member interposed therebetween and a lead wire, which are hermetically covered with a flexible film with only the lead wire led out.

3. A striking energy absorbing structure for a steering wheel according to claim 1, wherein said horn switch member is of a contactless type which is composed of a piezoelectric type electrically-conductive rubber and conductor plates clamping said rubber therebetween.

4. A method of manufacturing a striking energy absorbing structure for a steering wheel, said structure being composed of a cover member, an energy absorbing member of a brittle plastic, and a horn switch member disposed therebetween, comprising the steps of:
    (a) setting said horn switch member inside said cover member; and
    (b) casting a brittle plastic material into the inside of said cover member to mold said energy absorbing member.

5. A method of manufacturing a striking energy absorbing structure for a steering wheel according to claim 4, wherein said cover member is formed with a recess for setting said horn switch member.

* * * * *